Patented Apr. 8, 1952

2,591,841

UNITED STATES PATENT OFFICE 2,591,841

HYDROHALOGENATION OF UNSATURATED CONJUNCT POLYMERS

Carl B. Linn, Riverside, Ill., assignor to Universal Oil Products Company, Chicago, Ill., a corporation of Delaware No Drawing. Application October 1, 1949,
Serial No. 119,199

9 Claims. (Cl. 260—663)

This invention relates to the production of cycloalkyl and cycloalkenyl halides in a process comprising the hydrohalogenation of a particular class of cyclic, polyenic hydrocarbons, more specifically defined as unsaturated conjunct polymers. In its more specific aspects, the present invention concerns a method of condensing a hydrogen halide of a halogen above fluorine in atomic number with a polyolefinic, cyclic hydrocarbon in the presence of substantially anhydrous liquid hydrogen fluoride as an addition complex therewith to form said cyclic alkyl and cyclic alkenyl halides.

The introduction of halogen radicals into unsaturated hydrocarbons by direct halogenation utilizing the halogen itself is a process of recognized operability. The method, however, invariably results in the introduction of at least two halogen groups on the carbon atoms constituting the unsaturated linkage of the compound subjected to halogenation, such that mono-halogenation of the unsaturated carbon atoms is not generally obtained. The use of the corresponding hydrogen halide to effect hydrohalogenation and thus the introduction of a single halogen group on the unsaturated linkage is possible only under certain conditions of reaction and usually only with the aid of a suitable catalytic agent. Likewise, hydrohalogenation of poly-olefinic, cyclic hydrocarbons, such as the unsaturated hydrocarbon product of a conjunct polymerization reaction, the hydrocarbons of which contain from about 2.5 to about 4 double-bonds per molecule, is not obtained by contacting the hydrogen halide with the hydrocarbons even at high pressures and under reaction conditions normally favorable to hydrohalogenation.

It is an object of this invention to provide a method for the hydrohalogenation of an unsaturated hydrocarbon conjunct polymer to effect the production of alkyl and/or alkenyl halides having a cyclic structure corresponding to the hydrocarbons contained in the mixture of unsaturated conjunct polymers.

Another object of the invention is to convert a mixture of poly-olefinic, cyclic hydrocarbons to hydrogen halide addition analogues, wherein the added hydrogen halide occupies the formerly unsaturated positions of the poly-olefinic cyclic hydrocarbon charging stock.

A further object of the invention is to provide a process for the production of cycloalkyl and cycloalkenyl halides containing halogen radicals of atomic number greater than fluorine.

In accordance with one of its embodiments, the present invention concerns a process of hydrohalogenating a mixture of poly-olefinic, cyclic hydrocarbons consisting of the unsaturated product of a conjunct polymerization reaction which comprises contacting a hydrogen fluoride sludge containing said poly-olefinic, cyclic hydrocarbons as hydrogen fluoride addition complexes thereof with a hydrogen halide of a halogen selected from the group consisting of chlorine, bromine and iodine at hydrohalogenation reaction conditions.

A more specific embodiment of the present invention relates to a process for effecting hydrohalogenation of an unsaturated conjunct polymer hydrocarbon which comprises contacting a mixture of said hydrocarbon and liquid, substantially anhydrous hydrogen fluoride with a hydrogen halide of a halogen selected from the group consisting of chlorine, bromine and iodine at a superatmospheric pressure and at a temperature of from about $-10°$ to about $100°$ C.

Other objects and embodiments of the present invention will be referred to in greater detail in the following further description of the invention.

In accordance with the present hydrohalogenation process a particular type of poly-olefinic, cyclic hydrocarbon, herein referred to as unsaturated conjunct polymers, are contacted with a hydrogen halide of a halogen above fluorine in atomic number at hydrohalogenation reaction conditions while said conjunct polymer hydrocarbons are dissolved in liquid, substantially anhydrous hydrogen fluoride as an addition complex therewith. The term "unsaturated conjunct polymers" designates a particular type of hydrocarbon derived from a specific source, the product of a conjunct polymerization reaction. The hydrocarbons in the mixture are of relatively high molecular weight, above about 150 and usually of cyclic, non-aromatic structure containing conjugated as well as non-conjugated unsaturation. They are formed by contacting an unsaturated, non-aromatic hydrocarbon, such as an olefin, poly-olefin, a hydrocarbon containing acetylenic linkages, a cyclic alkenyl or poly-alkenyl hydrocarbon, or an insoparaffin hydrocarbon containing at least three carbon atoms per molecule with a conjunct polymerization catalyst, selected from the general group of catalysts characterized as acid-acting polymerization catalysts at reaction conditions hereinafter more specifically defined. They may also be formed as an incidental byproduct of certain hydrocarbon conversion processes utilizing catalysts capable of causing conjunct polymerization of the hydrocarbon reactants charged thereto, as for example, in the catalyzed alkylation of isoparaffins with olefins, in the polymerization of olefins to form higher molecular weight hydrocarbons, and in other hydrocarbon conversion reactions generally known to the art in which a sludge-like product is obtained during the process. In these reactions wherein conjunct polymerization of the hydrocarbon charging stock is obtained, the conjunct polymer hydrocarbon product is recovered from the sludge formed in the reaction, the latter containing complex addition products of the catalyst component and the unsaturated conjunct polymers which may be subsequently recovered therefrom by subjecting the sludge to a particular type of decomposition procedure designed to eliminate condensation and polymerization of the hydrocarbons. Typical of the catalysts capable of causing said conjunct polymerization are the various Friedel-Crafts metal halides, such as anhydrous aluminum chloride and aluminum bromide and certain members of the mineral acids, such as concentrated sulfuric acid, and substantially anhydrous hydrogen fluoride, as well as others generally known to the art. When hydrogen fluoride is utilized as the conjunct polymerization catalyst in the formation of the present hydrocarbon charging stock, it is not essential to recover the unsaturated conjunct polymers therefrom prior to dissolution of the conjunct polymers in the hydrogen fluoride in accordance with the present process, since the hydrogen fluoride sludge initially obtained in the conjunct polymerization reaction is similar in all determinable respects to a solution of unsaturated conjunct polymers in hydrogen fluoride whether the particular catalysts utilized in the preparation of the unsaturated conjunct polymers in the conjunct polymerization reaction is hydrogen fluoride, concentrated sulfuric acid, an aluminum halide, or other conjunct polymerization catalyst.

In the preparation of the unsaturated conjunct polymers a hydrocarbon of the above specified characteristics, generally a non-aromatic hydrocarbon or a hydrocarbon mixture consisting of mono- or poly-olefinic and/or acetylenic hydrocarbons containing at least 3 carbon atoms per molecule, or a branched chain paraffin is contacted and intimately mixed with the conjunct polymerization catalyst at temperatures of from about −10° to about 200° C., preferably from about 30° to about 100° C., and at a pressure sufficient to maintain the reactants in substantially liquid phase during a reaction period of from about ½ to about 2 hours in duration. A sludge-like product containing the unsaturated conjunct polymers as an addition complex thereof with the conjunct polymerization catalyst separates at the termination of the reaction from an upper hydrocarbon phase of the reaction mixture containing saturated cyclic hydrocarbons and may be separated therefrom by decantation. The unsaturated conjunct polymers, subsequently recovered from the sludge, usually have molecular weights of from about 150 to about 450, up to a maximum of about 1000, have bromine numbers well over 100, depending upon the molecular weight of the fraction considered, and contain from about 2 to about 4 double bonds per molecule, of which about 70% are in conjugated relationship with each other.

The unsaturated conjunct polymers are recovered from the sludge by special methods of decomposing the hydrocarbon-catalyst addition complexes contained in the sludge in which special precautions are taken to retain the original structure and the conjugated relationship of the olefinic bonds in the unsaturated conjunct polymers by preventing condensation and interpolymerization of the hydrocarbons.

One of the preferred methods of sludge decomposition comprises hydrolizing the catalyst-hydrocarbon complexes by mixing the sludge with water accompanied by rapid stirring to dissipate the heat liberated by hydrolysis of the sludge complexes. The temperature of the hydrolytic reaction may also be controlled by effecting the hydrolysis in the presence of ice and water or by the addition of a low boiling solvent, such as butane to the reaction mixture. The unsaturated conjunct polymer product rises to the top of the aqueous phase and may be recovered therefrom by simple decantation.

The hydrolytic method of recovering the hydrocarbons from the sludge may be utilized regardless of the type of conjunct polymerization catalyst employed in the reaction, although it is particularly applicable to catalyst sludges in which the catalyst is non-volatile, such as sulfuric acid, and aluminum halide, etc.

Another method of recovering the conjunct polymers where hydrogen fluoride is utilized as the catalyst comprises heating the sludge to remove the hydrogen fluoride therefrom by distillation, and although it is not necessary to separate the unsaturated conjunct polymers from the hydrogen fluoride sludge prior to the present hydrohalogenation treatment, it may be preferred in some instances to utilize a specific fraction of the mixture of unsaturated conjunct polymers in the hydrohalogenation process and in such instances the unsaturated conjunct polymers must be separated from the hydrogen fluoride sludge, thereafter fractionated to separate said desired fraction, and the thus separated fraction subsequently re-dissolved in liquid hydrogen fluoride in the present hydrohalogenation process. In the latter distillation method of recovery, polymerization and deterioration of the conjunct polymer product, usually accompanying the simple thermal decomposition of the sludge in the absence of special precautions, may be reduced by charging the sludge into an inert liquid hydrocarbon maintained at the desired decomposition temperature (usually from about 150° to about 200° C.) and rapidly removing the hydrogen fluoride vapors from contact with the liberated conjunct polymers which dissolve in the inert hydrocarbon diluent. The hydrocarbon product is thus protected from further contact with the liberated hydrogen fluoride which in its free state causes polymerization and other deterioration of the product. The latter is thereafter recovered from the diluent by a fractional distillation of the mixture, usually at sub-atmospheric pressures.

The unsaturated hydrocarbon conjunct polymer product consists of a mixture of poly-olefinic, cyclic hydrocarbons of generally homologous structure, the cyclic portion of the hydrocarbons having a cyclopentenyl structure, in which an olefinic double bond present in the cyclopentene ring is in conjugation with an olefinic double bond present in an alkenyl or an alkapolyenyl side chain, as indicated in the following general structural formula representing the individual components of the hydrocarbon mixture:

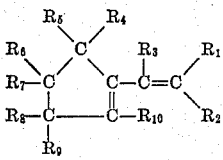

wherein substituents $R_1$—$R_{10}$ are selected from the group consisting of hydrogen, alkyl, alkenyl, alkapolyenyl, and cycloalkyl radicals, not more than two of the group $R_1$—$R_4$ being hydrogen. The mixture of unsaturated conjunct polymer hydrocarbons has a relatively broad boiling range of from about 150° to over 450° C., density of from about 0.83 to about 0.93, index of refraction of from about 1.47 to about 1.53, specific dispersion of from about 125 to about 175, a bromine number of about 140 (although the latter varies considerably with the average molecular weight), a maleic anhydride value of from about 30 to about 90, acid number below about 3 and molecular weights of individual hydrocarbons in the mixture of from about 150 to as high as about 1000, the usual average being in the neighborhood of about 300. Specific fractions of the mixture may be utilized, where it is desired to obtain a product of particular molecular weight and structure. For the purpose of separating such fractions, it is preferred to employ sub-atmospheric pressures to decrease the boiling point and thereby prevent deterioration of the hydrocarbon components at the relatively high boiling points of the hydrocarbons.

In the present hydrohalogenation process the unsaturated conjunct polymer hydrocarbon charging stock is contacted with liquid hydrogen fluoride in an amount sufficient to form hydrogen fluoride addition complexes of the unsaturated hydrocarbon charge and the resultant sludge-like mixture contacted with the hydrogen halide at atmospheric, or preferably superatmospheric pressure to form the cycloalkyl and cycloalkenyl halides herein provided as products of the present process. As heretofore indicated, when the hydrogen fluoride is utilized as the catalyst in the conjunct polymerization process to form a sludge containing the present unsaturated conjunct polymer charging stock, preliminary separation of the unsaturated conjunct polymers from the sludge is not necessarily essential; the sludge thus formed may be transferred directly to the hydrohalogenation process without entire separation of the unsaturated conjunct polymers therefrom. Where, however, the unsaturated conjunct polymers are formed in the presence of a catalyst such as aluminum chloride or concentrated sulfuric acid, the conjunct polymers must necessarily be separated from the sludge product resulting therefrom by means of one of the aforementioned decomposition procedures and the unsaturated conjunct polymers recovered therefrom subsequently admixed with liquid hydrogen fluoride to form the required liquid sludge-like material utilized as charging stock to the hydrohalogenation procedure herein provided. It has been found that the unsaturated conjunct polymers formed by any of the various alternative conjunct polymerization catalysts are similar in cyclic structure, degrees of unsaturation, combining power with hydrogen fluoride and other physical properties, such that the resulting hydrohalogenated product is similar in structure regardless of the particular conjunct polymerization catalyst utilized in the formation of the unsaturated conjunct polymer charging stock.

Liquid, substantially anhydrous hydrogen fluoride (that is containing less than about 10% by weight of water) provides the required solvent and fluid transfer medium for effecting the addition of a hydrogen halide to the unsaturated conjunct hydrocarbon polymer molecule in the present process. The liquid hydrogen fluoride affords more than a mere solvent effect on the conjunct polymers; it combines with the hydrocarbon charging stock as an addition complex therewith in the proportion of six moles of hydrogen fluoride per olefinic bond of the unsaturated conjunct polymer charging stock. The hydrogen fluoride is apparently an essential component of the reaction mixture in obtaining the desired hydrohalogenation of the conjunct polymers, since other solvents such as saturated hydrocarbons are generally inoperable in the present system to effect hydrohalogenation at the essential reaction conditions utilized in the present process. The hydrogen fluoride component is added to the reaction mixture in an amount sufficient to completely combine with the unsaturated conjunct polymers and form the indicated addition complexes thereof; that is, an amount sufficient to provide at least 6 moles of hydrogen fluoride per olefinic bond of the unsaturated conjunct polymers charged, although larger quantities of hydrogen fluoride may be utilized in the reaction mixture to reduce the viscosity of the resultant sludge-like mixture. The hydrogen fluoride component of the reaction mixture contains at least 90% hydrogen fluoride by weight and is preferably of 95 or higher percent concentration. The hydrogen fluoride and unsaturated conjunct polymer components are desirably mixed by thoroughly stirring the components at a temperature of from about —10° to about 30° C. and the resulting mixture transferred to the hydrohalogenation reactor.

Hydrohalogenation of unsaturated conjunct polymer hydrocarbons dissolved in a menstruum of liquid, substantially anhydrous hydrogen fluoride is effected in accordance with the present process by contacting a hydrogen halide of a halogen selected from the group consisting of chlorine, bromine and iodine at a temperature of from about —10° to about 100° C. while maintaining the hydrogen fluoride sludge components in substantially liquid phase during the hydrohalogenation. At relatively low temperatures within the above range, at temperatures sufficiently low to eliminate the vaporization of a large proportion of the hydrogen fluoride from the mixture, hydrohalogenation may be accomplished at atmospheric pressure by merely bubbling the hydrogen halide through a column of the hydrogen fluoride-conjunct polymer hydrocarbon mixture for a time sufficient to effect the desired degree of conversion. In this method of operation, the hydrogen halide, as a gas, is desirably introduced as one or more fine streams into the bottom of a vertical column of the hydrogen fluoride-conjunct polymer hydrocarbon mixture. The hydrogen halide which fails to combine with the conjunct polymer component as well as any vaporized hydrogen fluoride may be recycled from the effluent end of the column to the bottom thereof, thus reducing the quantity of these reagents required in the process. The column may contain a suitable packing material to interrupt the flow of hydrogen halide gas therethrough and thereby effect a more intimate and prolonged contact of the hydrogen halide gas with the hydrogen fluoride-conjunct polymer liquid mixture. Suitable packing materials include solid shaped or preformed substances resistant to the action of the hydrogen halide gas or liquid hydrogen fluoride, such as alumina berl saddles, copper rivets, etc.

The preferred method of contacting the hydrogen halide gas with the liquid hydrogen fluoride-conjunct polymer hydrocarbon mixture comprises contacting the reactants at relatively high pressures in a vigorously stirred reactor, such as a stirred pressure autoclave. Pressures of from atmospheric to about 100 atmospheres may be utilized and are generally operable, limited only by the pressure reactions on the particular apparatus utilized. Complete conversion of the conjunct polymer hydrocarbon charge to the corresponding cycloalkyl and cycloalkenyl halides is, in general, rarely obtained regardless of the period of contact of the hydrogen halide with the hydrogen fluoride sludge containing the unsaturated conjunct polymers. It is generally preferred to provide a reaction period of from about ½ to about 20 to 24 hours of contact between the hydrogen halide and hydrogen fluoride sludge reacting components, thereafter separating the hydrogen fluoride from the reaction mixture and fractionally distilling the mixture of unconverted hydrocarbons and cycloalkyl and alkenyl halides to separate the converted portion of the reaction mixture from the unreacted charging stock.

The preferred hydrogen halide utilizable in the present process, on the basis of yield and reactivity, is hydrogen chloride, although hydrogen bromide and to a lesser extent, hydrogen iodide, may likewise be utilized where the corresponding cycloalkyl and cycloalkenyl bromines and iodines are desired products of the reaction. The hydrogen halide reactants are preferably supplied in the form of an anhydrous gas which is preferably adjusted to the desired reaction temperature prior to its introduction into the hydrohalogenation reactor containing the liquid reactants.

Following the hydrohalogenation reaction to the desired state of completion, the hydrogen fluoride component of the reaction mixture is separated therefrom by any suitable method of removal, such as the methods heretofore described with reference to the removal of hydrogen fluoride from a conjunct polymerization sludge. Thus, the reaction mixture may be added to water to effect hydrolysis of the hydrogen fluoride-conjunct polymer addition complexes contained therein, preferably at a relatively low temperature, such as that obtainable in a mixture of ice and water. The hydrogen fluoride component may also be removed and the product separated by distillation means, desirably at subatmospheric pressure to reduce losses from deterioration of the product by polymerization, dehalogenation or other destructive side reactions which may accompany the distillation of the product reaction mixture at higher distillation temperatures accompanying atmospheric distillation. Another suitable method of removing the hydrogen fluoride component from the reaction mixture by vaporization of the same therefrom comprises charging the reaction mixture into an inert hydrocarbon diluent maintained at a temperature of from about 100° to about 150° C., the decomposition temperature of the hydrogen fluoride-hydrocarbon and organic halide addition complexes contained in the reaction mixture. The inert hydrocarbon diluent dissolves the unsaturated hydrocarbon and organic halide compounds liberated by decomposition of the hydrogen fluoride sludge complexes thereof and removes the same from the polymerizing action of the hydrogen fluoride component. The excess unsaturated conjunct polymer hydrocarbon reactants and organic halide products are subsequently recovered from the inert hydrocarbon diluent by fractional distillation means, while the vaporized hydrogen fluoride is recovered as an overhead effluent which may be recycled for subsequent conversion of an additional charge of reactants. The decomposition of the hydrogen fluoride sludge complexes contained in the reaction mixture may also be effected in the presence of certain catalytic agents which promote the decomposition of the addition complexes. Such decomposition catalysts include in general such metals as copper, aluminum, cobalt, lead, tin, brass and nickel and certain forms of graphitic, non-activated carbon. In this method of decomposing the sludge complexes contained in the hydrohalogenation reaction mixture, the latter mixture is passed at the decomposition temperature of from about 100° to about 150° C. through a bed of catalyst particles of a size and distribution to allow free passage of the hydrogen fluoride vapors from the effluent end of the reactor and free downward flow of the liberated unconverted conjunct polymer hydrocarbons and organic halides contained in the reaction mixture. In this method of decomposition an inert diluent hydrocarbon such as a naphtha fraction of a straight run gasoline boiling range material containing saturated hydrocarbons is desirably charged in admixture with the hydrohalogenation reaction mixture to increase the flow of liquid products downwardly in the column from the decomposition zone. Distillation of the recovered bottoms product from the decomposition reactor to thereby separate organic halide products from unconverted hydrocarbons and inert hydrocarbon diluent is effected at sub-atmospheric pressures, desirably from about 1 to about 100 mm. mercury absolute, thereby eliminating the high temperatures and accompanying deterioration of the product which may occur in the distillation at atmospheric pressures.

The cyclic organic halides formed as products of the present process are relatively stable, except at high temperatures of from about 150° to about 200° C. at which point they tend to decompose to liberate hydrogen halide therefrom. They may be hydrolized for example in the presence of caustic soda and water, to form the corresponding alcohols in which the hydroxyl group replaces the halogen radical present in the organic halide. Likewise, the product may be reacted with ammonia to form the corresponding amine or with cyanides to form the corresponding nitriles. The present products are consequently useful per se as valuable intermediates in the formation of other organic derivatives. Because of their unusual cyclic structure in which the cyclic nucleus is substituted on multiple positions by halogen, alkyl and unsaturated hydrocarbon radicals, structures which are not readily duplicated by synthetic means, the present method of production represents substantially the only source of such compounds. The unsaturated organic halide products are useful as reactants in resin and drying oil production through polymerization or condensation with other reactants or by self-polymerization of the present products.

The present invention is further described with reference to specific charging stocks and to particular methods of operation in the following examples, which, however, are not intended to limit the generally broad scope of the invention in strict accordance therewith.

Example I

A mixture of unsaturated conjunct polymers comprising poly-olefinic cyclic hydrocarbons was prepared and recovered from a hydrogen fluoride conjunct polymerization sludge in accordance with the following procedure: 263 parts by weight of non-selective polymer gasoline (copolymers of propylene and butylenes) having a bromine number of approximately 132, an average molecular weight of approximately 105 and a boiling range of from about 28° to about 225° C. was gradually stirred into 222 parts by weight of liquid, substantially anhydrous hydrogen fluoride at a temperature of about 93.5° C. for a reaction period of about 1 hour, the polymer gasoline being added to the liquid hydrogen fluoride as the latter was stirred over a period of approximately ½ hour. The resulting reaction mixture was allowed to stand quiescent following the indicated reaction period and the emulsified mixture which characterized the product during the reaction separated into an upper, substantially saturated hydrocarbon phase (146.1 parts by weight) and a lower sludge phase comprising 336.7 parts by weight of liquid sludge product. The latter sludge phase was decanted from the saturated hydrocarbon layer, extracted with an equal volume of pentane to remove entrained saturated hydrocarbons from the sludge and then allowed to run into a mixture of ice and water to hydrolize the polyolefinic, cyclic hydrocarbon-hydrogen fluoride complex compounds contained in said sludge. The hydrolysis reaction resulted in the liberation of the conjunct polymer hydrocarbons which floated to the surface of the lower aqueous hydrofluoric acid phase. The mixture of hydrocarbons comprising the unsaturated conjunct polymer product had an initial boiling point of about 152° C. and approximately 90% distilled over at 418° C. The mixture of hydrocarbons had a bromine number of 178, a maleic anhydride value of 85 and a Gardner color of approximately 13–14.

128 grams of the hydrogen fluoride sludge prepared as indicated above (containing approximately 43 grams of unsaturated conjunct hydrocarbon polymers) was placed in a copper reaction vessel and 420 grams of gaseous hydrogen chloride passed into the solution during 65 hours at 25° C. A portion of the hydrogen fluoride from the sludge was removed during the passage of hydrogen chloride through the reactor, leaving 70.5 grams of hydrohalogenation product. The total product was decomposed by allowing the mixture to run into water containing ice, additional ice being added as the heat of the hydrolytic reaction melted the same. The organic product floated to the top of the aqueous phase and pentane was added to extract the liberated oil, followed by evaporation of the pentane from the extract phase. 52 grams of a water-insoluble oil was recovered from the hydrolytic decomposition of the sludge. The average molecular weight of the product was apporoximately 317 by cryosopic molecular weight determination; it contained 0.009% organic fluorine, and 2.3% by weight of organic chlorine. Ultraviolet absorption analysis indicated that the product consisted of unconverted conjunct polymer hydrocarbons and approximately 20% by weight of cyclic alkyl and cyclic alkenyl chlorides.

Example II 107 grams of hydrogen fluoride sludge prepared as in Example I above was placed in an 850 cc. rotating autoclave cooled in an ice-water bath. Gaseous hydrogen chloride was passed into the autoclave to a pressure of 600 pounds p. s. i. The pressure within the autoclave immediately began to fall and in 10 minutes was 435 p. s. i. When rotation of the autoclave and stirring of the contents thereof was begun, the pressure dropped to 310 pounds p. s. i. and in six hours was constant at 380 p. s. i. at 22° C. The pressure was thereafter released and 73 grams of hydrogen chloride was recovered. The reaction product was decomposed by aqueous hydrolysis as in Example I above and the organic, water immiscible phase recovered from the aqueous layer by decantation. The recovered organic layer upon fractional distillation yielded individual fractions consisting of unsaturated conjunct polymer hydrocarbons and other fractions consisting predominately of cyclic alkyl chlorides and cyclic alkenyl chlorides containing one atom of chlorine per mole of unsaturated conjunct polymer hydrocarbons charge. Approximately 31% conversion of the original unsaturated hydrocarbon charge to the corresponding cycloalkyl and cycloalkenyl halides is obtained by this method of hydrochlorination.

I claim as my invention:

1. A process for producing an organic halide which comprises reacting an addition complex of hydrogen fluoride and a polyolefinic cyclic hydrocarbon with a hydrogen halide of a halogen selected from the group consisting of chlorine, bromine, and iodine.

2. The process of claim 1 further characterized in that said addition complex is a sludge formed in a hydrogen fluoride catalyzed conjunct polymerization reaction.

3. The process of claim 1 further characterized in that said addition complex contains at least 6 moles of hydrogen fluoride per mole of polyolefinic cyclic hydrocarbon therein.

4. A process for producing an organic halide which comprises reacting an addition complex of hydrogen fluoride and a polyolefinic cyclic hydrocarbon with a hydrogen halide of a halogen selected from the group consisting of chlorine, bromine and iodine at a temperature of from about −10° to about 100° C.

5. A process for producing an organic halide which comprises reacting an addition complex of hydrogen fluoride and a polyolefinic cyclic hydrocarbon with a hydrogen halide of a halogen selected from the group consisting of chlorine, bromine and iodine at a superatmospheric pressure.

6. The process for producing hydrocarbon chlorides from a hydrogen fluoride sludge containing polyolefinic cyclic hydrocarbons and formed in a hydrogen fluoride catalyzed conjunct polymerization reaction, which comprises reacting said sludge with hydrogen chloride at atmospheric pressure and at a temperature of from about −10° to about 100° C. and for a time such that no further hydrogen chloride is absorbed by said hydrogen fluoride sludge, adding the resulting hydrochlorination product to a mixture of ice and water, recovering the water insoluble organic product from the resulting aqueous phase and fractionally distilling said organic product to separate therefrom cycloalkyl and cycloalkenyl chlorides.

7. The process for producing hydrocarbon chlorides from a hydrogen fluoride sludge containing polyolefinic cyclic hydrocarbons and formed in a hydrogen fluoride catalyzed conjunct polymerization reaction, which comprises reacting said sludge with hydrogen chloride at a superatmospheric pressure and at a temperature of from about −10° to about 100° C. for a time such that no further hydrogen chloride is absorbed by said hydrogen fluoride sludge, adding the resulting hydrochlorination product to a mixture of ice and water, recovering the water insoluble organic product from the resulting aqueous phase and fractionally distilling said organic product to separate therefrom cycloalkyl and cycloalkenyl chlorides.

8. A process for producing an organic halide which comprises dissolving a polyolefinic cyclic hydrocarbon in substantially anhydrous liquid hydrogen fluoride, and reacting the resultant solution at a hydrohalogenating temperature of from about −10° C. to about 100° C. with a hydrogen halide of a halogen selected from the group consisting of chlorine, bromine, and iodine.

9. A process for producing hydrocarbon chlorides from the mixture of polyolefinic cyclic hydrocarbons produced in the conjunct polymerization of non-aromatic hydrocarbons, which comprises dissolving said mixture in substantially anhydrous liquid hydrogen fluoride, and reacting the resultant solution with hydrogen chloride at a temperature of from about −10° C. to about 100° C.

CARL B. LINN.

REFERENCES CITED

The following references are of record in the file of this patent:

UNITED STATES PATENTS

| Number | Name | Date |
|---|---|---|
| 2,491,496 | Johnstone | Dec. 20, 1949 |